(12) United States Patent
Banihashemi et al.

(10) Patent No.: US 10,502,251 B2
(45) Date of Patent: Dec. 10, 2019

(54) STRUCTURAL ASSEMBLY AND METHOD

(71) Applicant: The Boeing Company, Chicago, IL (US)

(72) Inventors: Bejan Banihashemi, Seattle, WA (US); Alex de Marne, Mountlake Terrace, WA (US); Russell Keck, Seattle, WA (US); Roland Mair, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 15/856,019

(22) Filed: Dec. 27, 2017

(65) Prior Publication Data

US 2019/0195259 A1 Jun. 27, 2019

(51) Int. Cl.

| | | |
|---|---|---|
| *F16B 17/00* | (2006.01) | |
| *B64D 11/00* | (2006.01) | |
| *B32B 3/12* | (2006.01) | |
| *B32B 5/18* | (2006.01) | |
| *F16B 5/02* | (2006.01) | |
| *F16B 5/01* | (2006.01) | |
| *F16B 11/00* | (2006.01) | |
| *B32B 7/08* | (2019.01) | |

(52) U.S. Cl.
CPC ............... *F16B 17/00* (2013.01); *B32B 3/12* (2013.01); *B32B 5/18* (2013.01); *B32B 7/08* (2013.01); *B64D 11/0023* (2013.01); *F16B 5/01* (2013.01); *F16B 5/02* (2013.01); *F16B 11/006* (2013.01); *B32B 2605/18* (2013.01)

(58) Field of Classification Search
CPC ........................................................ F16B 17/00
USPC .......................................................... 428/99
See application file for complete search history.

(56) References Cited

U.S. PATENT DOCUMENTS

| | | |
|---|---|---|
| 5,449,132 A | 9/1995 | Gilbert |
| 7,014,383 B2 | 3/2006 | Schmid et al. |

(Continued)

FOREIGN PATENT DOCUMENTS

| | | |
|---|---|---|
| EP | 2980420 | 2/2016 |
| EP | 3424812 | 1/2019 |
| GB | 794519 | 5/1958 |

OTHER PUBLICATIONS

BLOCKDESIGN Brochure of Pegboard Styling Shelf, retrieved Sep. 9, 2017.

(Continued)

*Primary Examiner* — Brent T O'Hern

(57) ABSTRACT

A structural assembly includes a first member and a second member. The first member has at least one fastener receptacle and at least one shear pocket formed in the member side. The Shear pocket has a pocket cross-section. The second member has at least one shear boss protruding outwardly from the second member, the shear boss has a boss cross-section shaped complementary to the pocket cross-section. The shear boss is configured to be received with the shear pocket and transfer only shear load between the first member and the second member. The structural assembly includes a tension fastener configured to engage the fastener receptacle and couple the first member to the second member and transfer only tension load therebetween at least during an initial transfer of the shear load between the first member and the second member by the shear boss.

20 Claims, 12 Drawing Sheets

(56) References Cited

U.S. PATENT DOCUMENTS

| | | |
|---|---|---|
| 8,777,537 B2 | 7/2014 | Fritsch |
| 2002/0090277 A1* | 7/2002 | LeVey ................... F16B 37/042 411/172 |
| 2016/0297525 A1 | 10/2016 | Walton |
| 2017/0313424 A1 | 11/2017 | Walton |

OTHER PUBLICATIONS

NMC Aerospace, Product Guide, retrieved Sep. 29, 2017.
EPO, Extended European Search Report for Serial No. EP18204924, dated Apr. 24, 2019.

\* cited by examiner

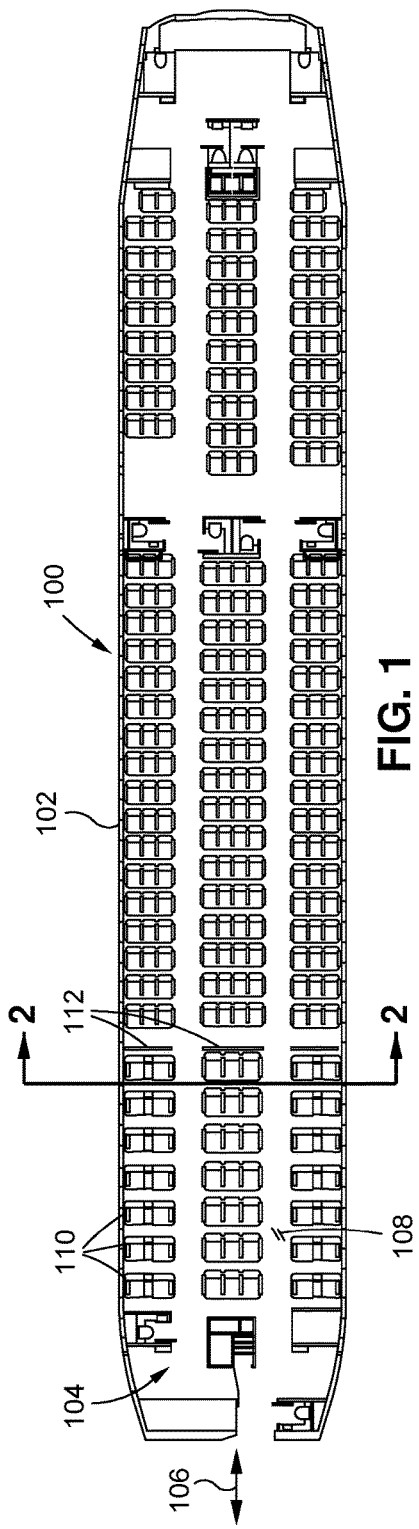
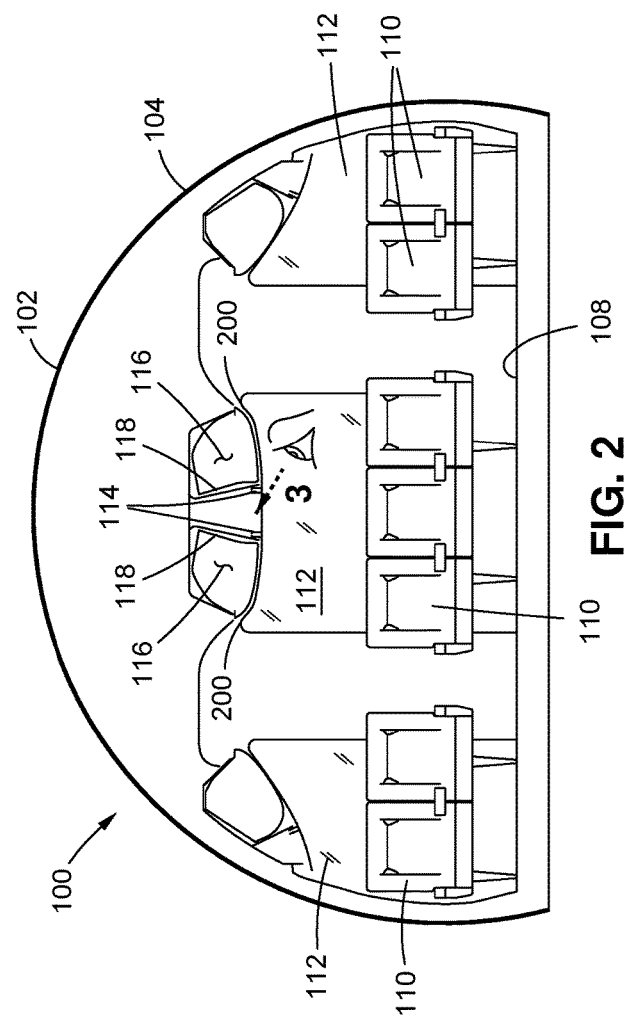
FIG. 1
FIG. 2

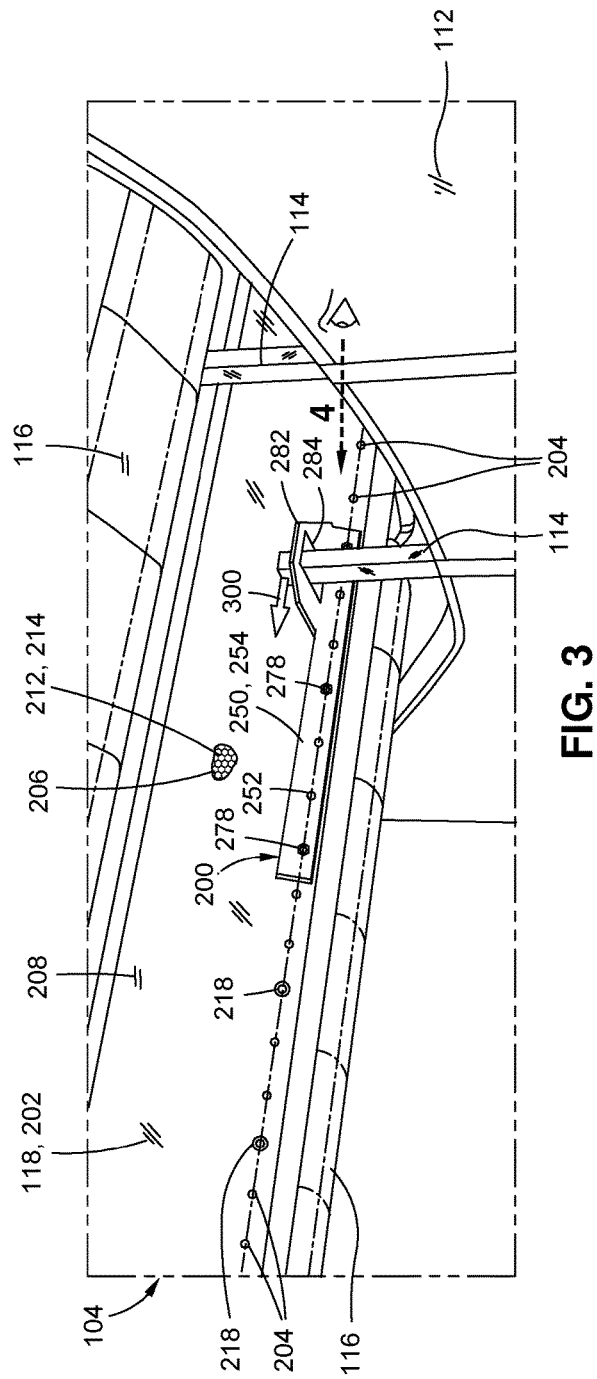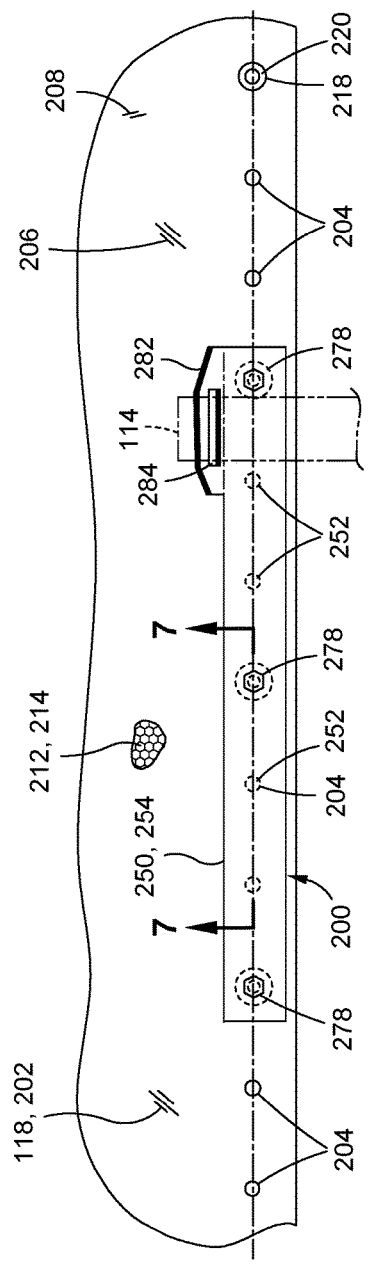

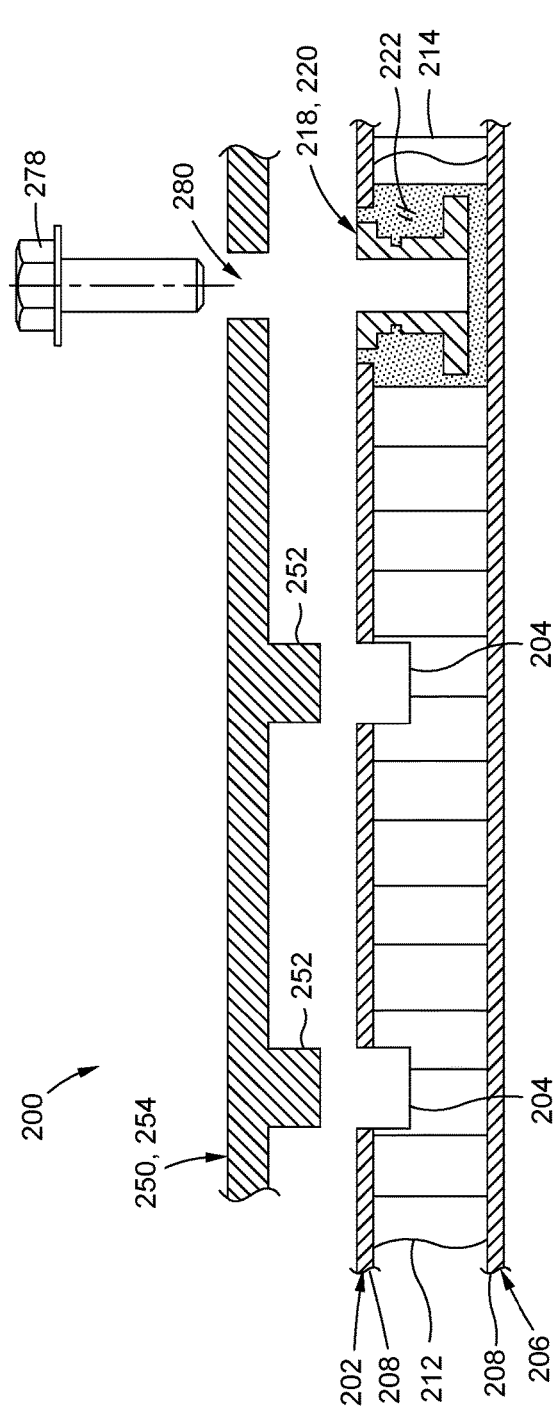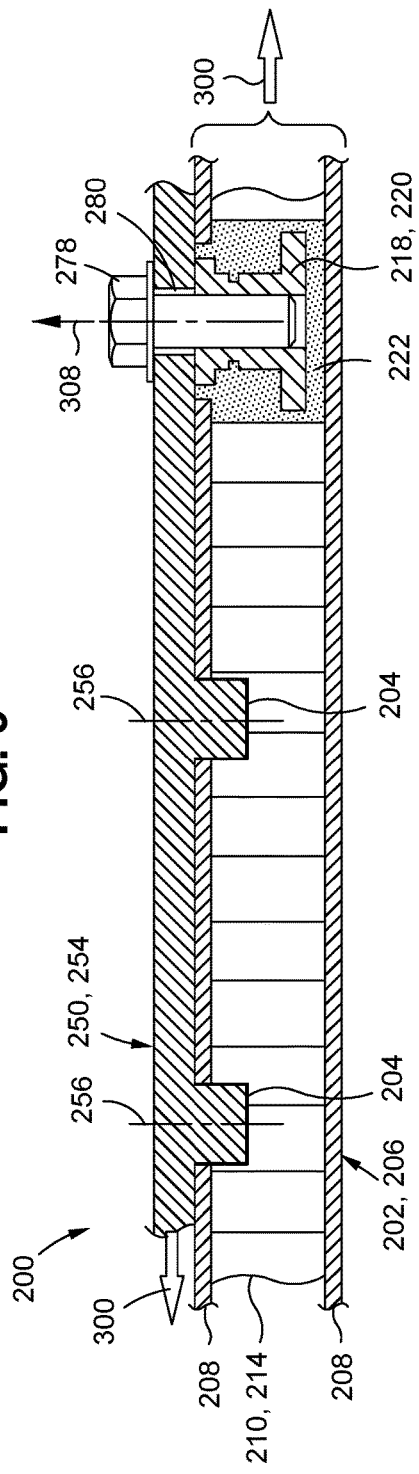

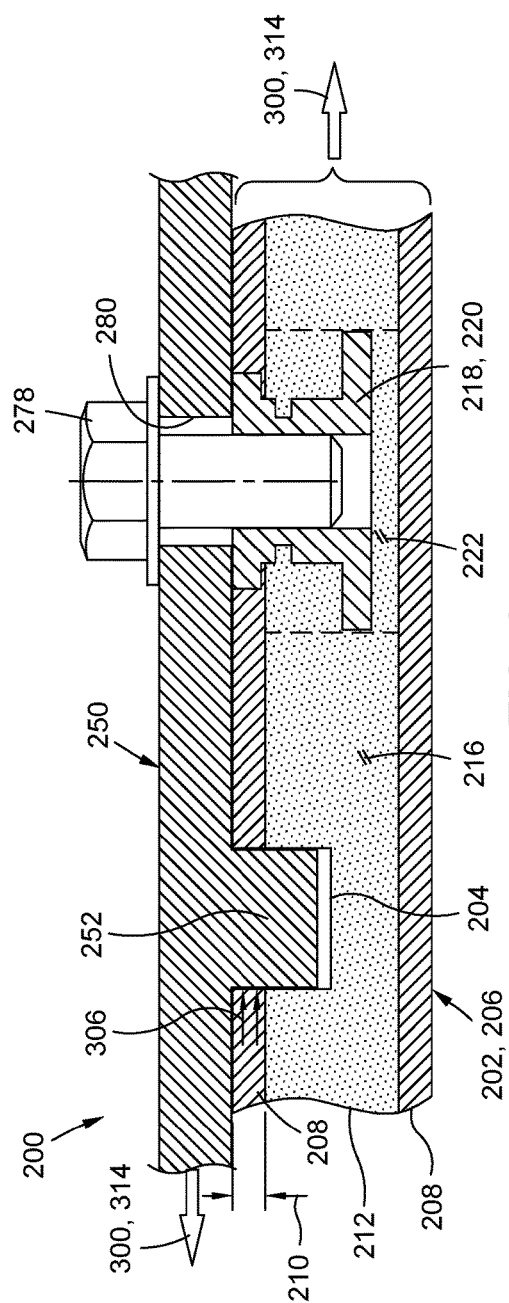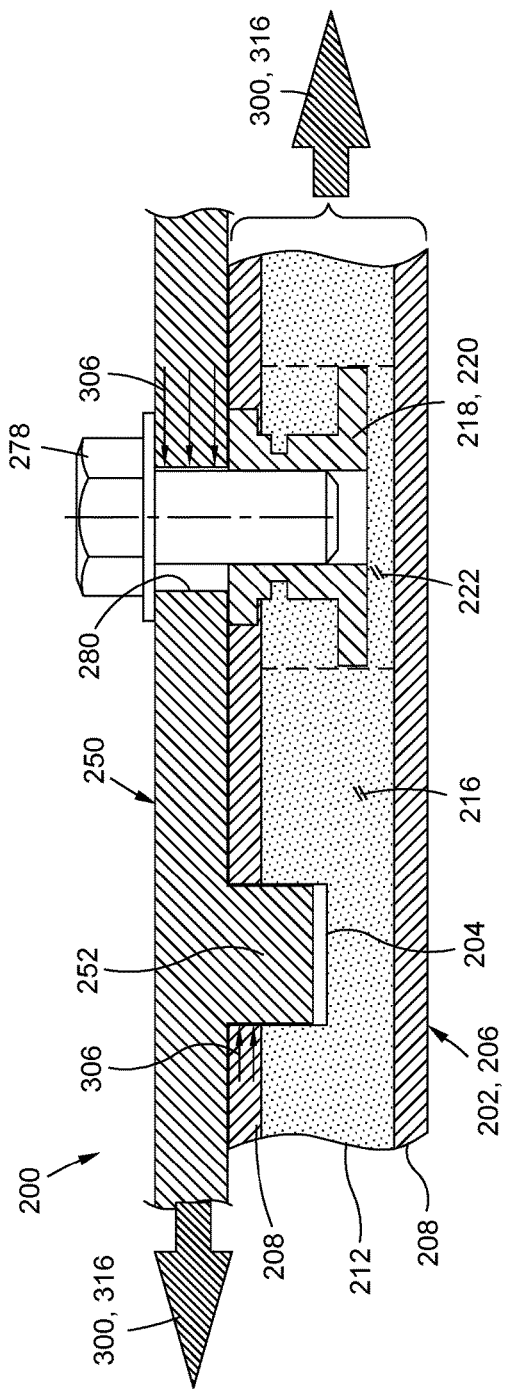

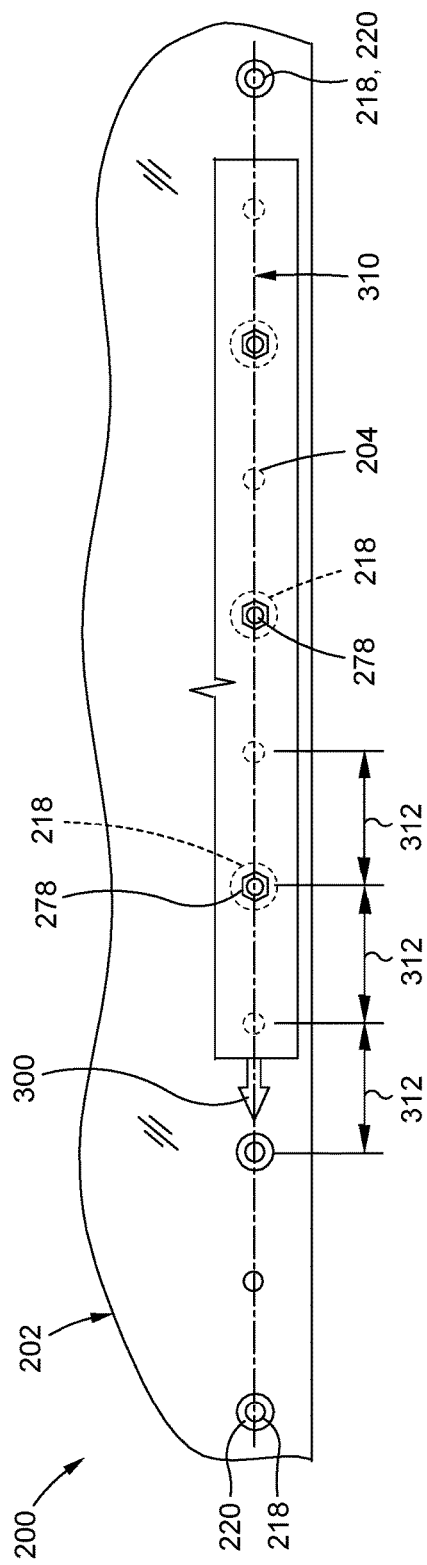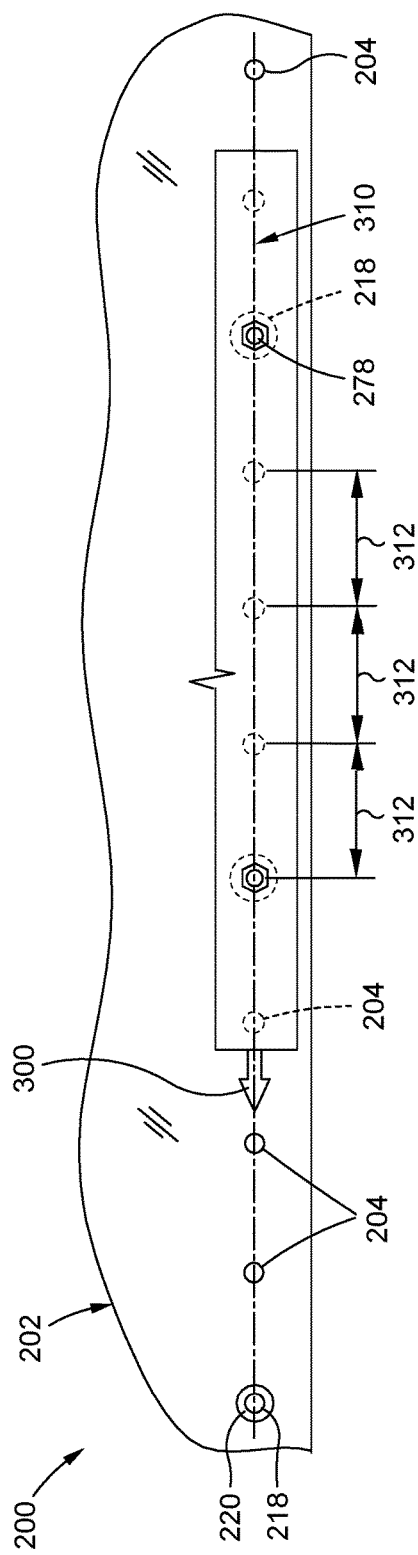

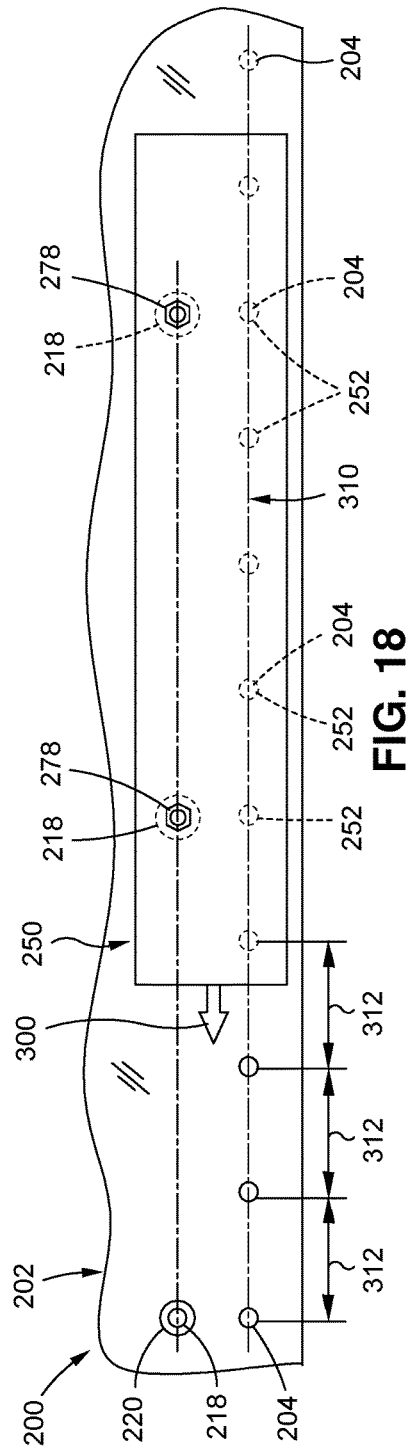
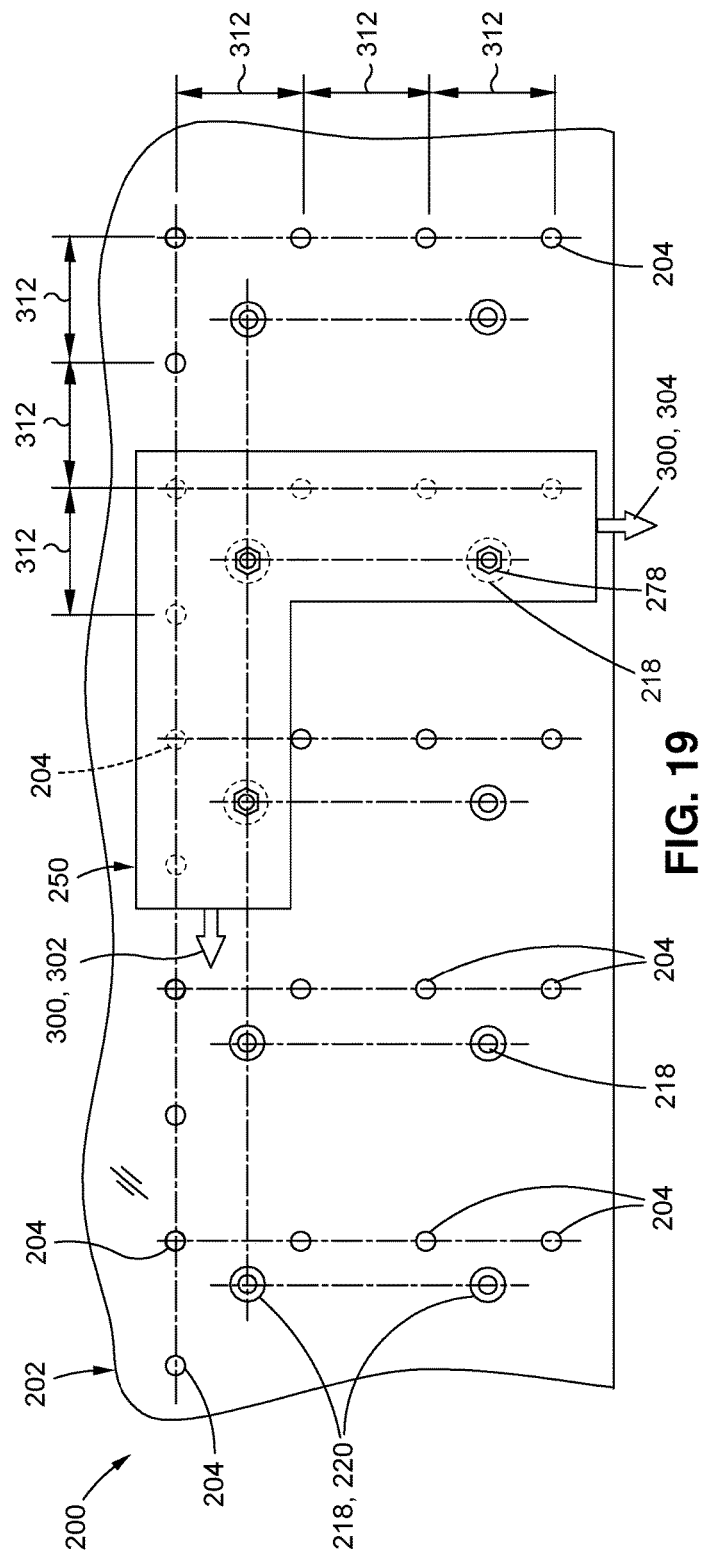

STRUCTURAL ASSEMBLY AND METHOD

FIELD

The present disclosure relates generally to structural configurations and, more particularly, to a system and method for transferring shear load between structural members.

BACKGROUND

The use of honeycomb panels as a structural material offers several advantages including relatively low specific weight, relatively high out-of-plane stiffness, and relatively low material cost. Honeycomb panels are made up of a pair of relatively thin face sheets interconnected by a core. The core is formed of lightweight material configured as an array of interconnected cells each having a hexagonal cross-sectional shape. The face sheets may be formed of metallic material or composite material such as one or more plies of fiber-reinforced fiber matrix material.

The use of honeycomb panels in structural assembles may require the installation of potted fasteners such as threaded inserts into the honeycomb panel to allow the use of threaded fasteners such as bolts for coupling a structural member to the honeycomb panel. The installation of a potted insert requires the local removal of a portion of the face sheet and core material of the honeycomb panel, after which a threaded insert is adhesively bonded (e.g., using a potting compound) to the honeycomb that surrounds the removed portion. The process must be repeated at each potential location where a structural member may be attached to the honeycomb panel, resulting in high labor costs. In some examples in which the structural member must be capable of removal and positioning at any one of multiple locations along the honeycomb panel, only a small fraction of the total quantity of potted inserts may be used to attach the structural member to the honeycomb panel. As may be appreciated, the unused potted inserts undesirably add to the overall weight of the honeycomb panel.

For some installations, the structural member being attached to the honeycomb panel may transmit loads to the honeycomb panel that are oriented primarily along a single loading direction. For example, a structural member may transmit primarily in-plane loads to the honeycomb panel, and which may be described as shear loads that are oriented along a direction parallel to the surface of the honeycomb panel. In addition to shear loads, other loads may be transmitted to the honeycomb panel. For example, tension loads may be transmitted along an out-of-plane direction perpendicular to the surface of the honeycomb panel.

As can be seen, there exists a need in the art for a system and method for coupling a structural member to a honeycomb panel or other structure in a manner that reduces the need for installing multiple potted fasteners in the honeycomb panel while allowing flexibility for installing a structural member at any one of a variety of locations along the honeycomb panel, and which is capable of transmitting shear loads with additional capability of transmitting tension loads.

SUMMARY

The above-noted needs associated with transferring shear load in structural assemblies are specifically addressed and alleviated by the present disclosure which provides a structural assembly having a first member and a second member. The first member has at least one fastener receptacle and at least one shear pocket formed in the member side. The shear pocket has a pocket cross-section. The second member has at least one shear boss protruding outwardly from the second member. The shear boss has a boss cross-section that is shaped complementary to the pocket cross-section. The shear boss is configured to be received within the shear pocket and transfer only shear load between the first member and the second member. The structural assembly includes a tension fastener configured to engage the fastener receptacle and couple the first member to the second member and transfer only tension load therebetween, at least during an initial transfer of the shear load between the first member and the second member by the shear boss.

Also disclosed is a method of assembling a first member with a second member. The method includes inserting a shear boss protruding outwardly from a second member into a shear pocket formed in a first member. The shear boss has a boss cross-section that is shaped complementary to a pocket cross-section of the first member. The shear boss is configured to transfer only shear load between the first member and the second member. The method further includes engaging a tension fastener of the second member with a fastener receptacle of the first member. The tension fastener is configured to transfer only tension load between the first member and the second member, at least during an initial transfer of the shear load between the first member and the second member by the shear boss.

In addition, disclosed is a method of transferring a shear load between a first member and a second member of a structural assembly. The method includes transferring only the shear load between the first member and the second member using a shear boss protruding outwardly from the second member and inserted into a shear pocket formed in the first member. The shear boss has a boss cross-section that is shaped complementary to a pocket cross-section of the first member. The method also includes transferring, using a tension fastener extending from the second member and engaged with a fastener receptacle of the first member, only tension load between the first member and the second member, at least during an initial transfer of the shear load between the first member and the second member by the shear boss.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a plan view of an aircraft cabin;

FIG. 2 is a sectional view taken along line 2 of FIG. 1 and illustrating class dividers positioned within the aircraft cabin;

FIG. 3 is a perspective view of an interior of the aircraft cabin taken along line 3 of FIG. 2 and illustrating an example of the attachment of class dividers to one or more stowage bin strongbacks using the presently-disclosed structural assembly incorporating a combination of shear bosses and tension fasteners;

FIG. 4 is a side view of the structural assembly taken along line 4 of FIG. 3 and illustrating of a second member (e.g., a bracket) having multiple shear bosses respectively inserted into a plurality of shear pockets of a first member (e.g., a honeycomb panel);

FIG. 6 is an exploded section view of the structural assembly of FIG. 4;

FIG. 7 is an assembled sectional view of the structural assembly of FIG. 6 and taken along line 7 of FIG. 4;

FIG. 8 is a section view of the structural assembly during the application of a shear load in a first loaded condition;

FIG. 9 is a section view of the structural assembly of FIG. 8 during the application of a shear load of higher magnitude in a second loaded condition;

FIG. 16 is a plan view of an example of a structural assembly in which alternating shear bosses and tension fasteners are arranged in a linear pattern;

FIG. 17 is a plan view of an example of a structural assembly in which a plurality of shear bosses are located between each adjacent pair of tension fasteners arranged in a linear pattern;

FIG. 18 is a plan view of an example of a structural assembly in which a plurality of shear bosses are arranged in a linear pattern that is offset from and parallel to a linear pattern of the tension fasteners;

FIG. 19 is a plan view of an example of a structural assembly in which a plurality of shear bosses and tension fasteners are arranged in at least two linear patterns respectively oriented in two different directions corresponding to different load directions of shear loads on the structural assembly;

DETAILED DESCRIPTION

Figure 5:
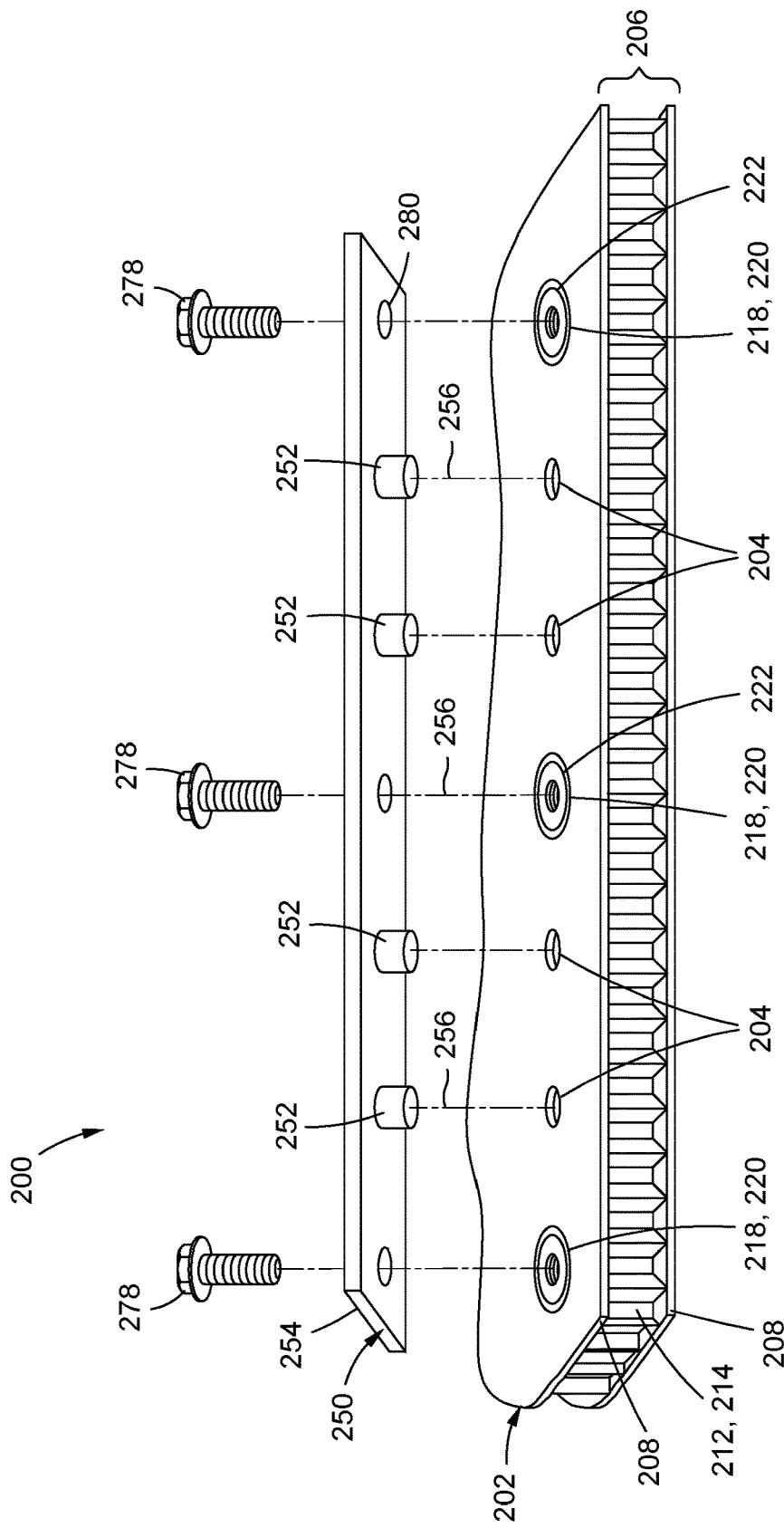
FIG. 5 is a partially exploded view of the second member (e.g., a bracket) and the first member (e.g., a honeycomb panel) illustrating the alignment of the shear bosses and tension fasteners with the shear pockets and fastener receptacles.

Referring now to the drawings wherein the showings are for purposes of illustrating preferred and various examples of the disclosure, shown in FIG. 1 is an example of an aircraft cabin 104 which may incorporate the presently-disclosed structural assembly 200. The aircraft 100 has a fuselage 102 that encloses the aircraft cabin 104 having a forward end, an aft end, and a cabin floor 108. The aircraft cabin 104 may have multiple rows of passenger seats 110 which may be secured to seat tracks (not shown) that may extend lengthwise along the cabin floor 108. In addition, the aircraft cabin 104 may include one or more class dividers 112 separating different lengthwise sections of the aircraft cabin 104.

Referring to FIG. 2, in the example shown, one or more of the class dividers 112 may be supported on the cabin floor 108 and may be secured to the cabin floor 108 such as to the seat tracks. The top portion of each class divider 112 may be coupled to one or more strongbacks 118 which may extend lengthwise along a forward-aft direction 106 of the aircraft cabin 104 above the rows of passengers seats. The strongback 118 may be formed as a sandwich panel 206. As mentioned above, a sandwich panel 206 may include a pair of relatively thin face sheets 208 interconnected by a core 212 formed of lightweight material such as foam 216 or honeycomb 214. The strongback 118 may extend at least partially along a length of the aircraft cabin 104 and may support the stowage bins 116 (e.g., overhead bins). Each one of the class dividers 112 may include one or more divider pins 114 which may extend upwardly from each class divider 112. The divider pins 114 may provide a means for coupling the top portion of the class divider 112 to the strongback 118 in a manner restricting movement of the class divider 112 at least in a forward-aft direction 106.

Referring to FIG. 3, each divider pin 114 may be coupled to a bracket 254 (e.g., a second member 250) which may be coupled to the strongback 118 (e.g., a first member 202) using the presently-disclosed shear bosses 252 and shear pockets 204 in combination with tension fasteners 278. Each divider pin 114 may extend through a bracket slot 284 formed in a flange 282 of a bracket 254 coupled to the strongback 118. The bracket slot 284 may allow the divider pin 114 to move vertically relative to the bracket slot 284 and may allow limited movement of the divider pin 114 along a direction perpendicular to the forward-aft direction 106 of the fuselage 102. The bracket slot 284 may be configured to restrict or prevent movement of the divider pin 114 along a direction parallel to the forward-aft direction 106 of the fuselage 102 as may occur during an unplanned maneuver of the aircraft 100.

Referring to FIG. 4, the structural assembly 200 of the bracket 254 and strongback 118 incorporates shear bosses 252 inserted into shear pockets 204 to resist shear load 300 generated when the bracket slot 284 resists movement of the divider pin 114 along the forward-aft direction 106. In addition, the structural assembly 200 of the bracket 254 and strongback 118 incorporates the use of tension fasteners 278 to resist tension load 308 as may be generated due to gravity acting on the mass of the shear bracket 254 and/or due to the bracket slot 284 resisting movement of the divider pin 114 along a direction perpendicular to the forward-aft direction 106. Such tension fasteners 278 may be engaged to fastener receptacles 218 such as threaded inserts 220 that may be adhesively bonded (e.g., potted) into the core 212 of a sandwich panel 206 such as the above-described honeycomb 214 panel of the strongback 118.

In some applications of the presently-disposed structural assembly 200, the shear load 300 may be generally of a higher magnitude than the tension load 308. Advantageously, the strongback 118 may include a plurality of shear pockets 204 which, along with the fastener receptacles 218, are located at spaced intervals along the length of the strongback 118 to allow for repositioning of the divider at any one of a variety of locations along the length of the aircraft cabin 104 as may be required during a reconfiguration of the cabin layout. As described below, the size and spacing 312 (FIGS. 16-19) of the shear bosses 252 and shear pockets 204 is dependent at least in part upon the magnitude of the predicted shear load 300 transmitted between the first member 202 and second member 250. The shear bosses 252 and shear pockets 204 advantageously replace a large portion of potted fasteners that would otherwise be required to be installed along the length of the strongback 118 to provide flexibility in repositioning the divider at any one of a variety of locations along the length of the aircraft cabin 104. By reducing the quantity of potted fasteners required to be installed, the presently-disclosed structural assembly 200 reduces the time, complexity and cost associated with preparing the strongback 118. In this regard, the cost of installing a plurality of shear pockets 204 in a sandwich panel 206 is significantly less than the cost of installing threaded inserts 220 in the sandwich panel 206. The presently-disclosed structural assembly 200 also results in weight savings while providing the capability for transmitting shear load 300 with additional capability of transmitting tension load 308.

FIGS. 1-4 illustrate one example of an implementation of the presently-disclosed structural assembly 200 in an aircraft 100. However, the presently-disclosed structural assembly 200 may be implemented in any one of a variety of non-aircraft applications. Further in this regard, the presently-disclosed structural assembly 200 may be implemented in any type of vehicular or non-vehicular applications, without limitation, including any type of building, structure, or assembly.

Referring to FIG. 5, shown is an exploded view of a second member 250 (e.g., a bracket 254) and a first member 202 (e.g., a honeycomb 214 panel) and illustrating the alignment of the shear bosses 252 and tension fasteners 278 of the second member 250 with the shear pockets 204 and fastener receptacles 218 of the first member 202. As indicated above, the structural assembly 200 includes a first member 202 (e.g., a panel such as a sandwich panel 206) having at least one fastener receptacle 218 and at least one shear pocket 204 formed in the member side. The shear pocket 204 has a pocket cross-section along a direction locally perpendicular (i.e., normal) to a side of the first member 202. The second member 250 (e.g., a bracket 254) has at least one shear boss 252 protruding outwardly from the second member 250. The shear boss 252 has a boss axis 256 and a boss cross-section in the axial direction that is shaped complementary to the pocket cross-section. The shear boss 252 is configured to be received with a shear pocket 204 and transfer only shear load 300 (e.g., in-plane load) between the first member 202 and the second member 250. In this regard, the shear bosses 252 are non-attached (e.g., non-threadably engaged, non-fastened, non-bonded, etc.) to the first member 202, and the shear bosses 252 are axially movable relative to the shear pocket 204. In the present disclosure, shear load 300 is oriented along a direction orthogonal to the boss axis 256. The shear bosses 252 are incapable of transferring tension load 308 (e.g., out-of-plane load) between the first member 202 and the second member 250. In the present disclosure, tension load 308 is oriented along a direction parallel the boss axis 256.

Referring to FIGS. 5-7, the presently-disclosed structural assembly 200 further includes a tension fastener 278 configured to couple the first member 202 to the second member 250. As described in greater detail below, the tension fastener 278 may transfer only tension load 308 between the first member 202 and the second member 250, at least during an initial stage of the transfer of the shear load 300 between the first member 202 and the second member 250 by the shear boss. Tension load 308 is oriented along an out-of-plane direction locally perpendicular to a panel side (e.g., a face sheet) which may be along a direction approximately parallel to the axis of the shear boss 252 and/or tension fastener 278. As mentioned above, the tension fasteners 278 are configured to couple the first member 202 to the second member 250 and transfer tension load 308 only up until the point at which the shear load 300 transferred between the shear boss 252 and the shear pocket 204 exceeds a predetermined threshold which may be prior to the occurrence of plastic deformation of the shear boss 252 and/or the first member 202, at which point the tension fastener 278 may contribute toward the transfer of shear load 300 between the first member 202 and the second member 250. The tension fastener 278 may be initially prevented from transferring shear load 300 by forming the fastener through-holes 280 in the first member 202 and/or the second member 250 with greater clearance than the clearance provided between the shear bosses 252 and shear pockets 204. For example, for a 0.188 inch (e.g., 5 mm) diameter bolt, the combination of the tension fastener 278 and fastener receptacle 218 may be configured to provide up to approximately 0.10 inch (2.54 mm) or more radial movement capability relative to one another and/or relative to the first member 202 or second member 250.

In some examples, the radial movement capability may be provided by oversizing the fastener through-hole 280 in the first member 202 or the second member 250 and/or by providing the fastener receptacle 218 as a threaded insert 220 having radial floating capability. In the above-described configurations, the tension fastener 278 may be prevented from picking up shear load 300 at least up to a predetermined threshold, as described below. In contrast, the shear bosses 252 may be sized to provide a relatively smaller amount of clearance between the shear boss 252 and the shear pocket 204. For example, the shear boss 252 and shear pocket 204 may be configured to provide a clearance fit of up to approximately 0.020 inch (e.g., 0.51 mm), although clearance fit values of greater or lesser than 0.020 inch may be provided.

In FIGS. 5-7, the fastener receptacle 218 is provided as a threaded insert 220 installed in the first member 202. The tension fastener 278 extends through a fastener through-hole 280 in the second member 250 and is threadably engaged to the threaded insert 220. As mentioned above, the threaded insert 220 may optionally be provided as a floating insert having approximately 0.030 or more radial movement capability. The threaded insert 220 may be bonded to the core 212 of the panel using potting compound 222 such as an epoxy-based compound. As described above, the first member 202 may be provided a sandwich panel 206 comprised of a pair of face sheets 208 interconnected by a core 212. The shear pocket 204 may formed in one of the face sheets 208. The shear pocket 204 may extend at least partially into the core 212 at least to a pocket depth that is at least as deep as the length of the shear boss 252. In an example not shown, one or more of the shear pockets 204 may extend completely through the panel including through the face sheets 208 on both sides of the panel. As mentioned above, the core 212 may be formed of foam 216 (FIGS. 8-9), honeycomb 214 (FIGS. 3-7, 10-12) or other materials. The core 212 may be provided in any one a variety of thicknesses such as approximately 0.25 inch to 1 inch (e.g., 6.35 to 25.4 mm) or more. The face sheets 208 may be formed of metallic material (e.g., aluminum, titanium, etc.) or non-metallic material such as carbon fiber composite material. Composite face sheets 208 may have a face sheet thickness 210 defined by the quantity of composite plies that make up the face sheet 208. For example, a face sheet 208 may have one or more composite plies, each of which may have a thickness of approximately 0.007 to 0.010 inch (e.g., 0.17 to 0.25 mm) or more.

The first member 202 (e.g., the panel) may optionally be provided as a generally planar panel or the first member 202 may be at least locally planar panel in the area of the interface of the first member 202 with the second member 250 (e.g., bracket 254) to allow the bracket 254 to move slightly in an in-plane direction during the transfer of shear load 300 between the bracket 254 and the panel at the point when the shear load 300 exceeds the predetermined threshold, as described below. The second member 250 (e.g., bracket 254) may also be at least locally planar in the area where the second member 250 interfaces with the first member 202 (e.g., the panel).

Referring to FIGS. 8-9, shown is an example of a structural assembly 200 wherein the first member 202 comprises a sandwich panel 206 having a core 212 formed of foam 216. The tension fastener 278 extends through a fastener throughhole 280 formed in the second member 250. The tension fastener 278 is threadably engaged to the threaded insert 220 in the first member 202. The fastener through-hole 280 in the second member 250 may be oversized to prevent the tension fastener 278 from picking up shear load 300, at least initially when the structural assembly 200 is in the first loaded condition 314. As an alternative to the configuration shown in FIGS. 8-9, in an example not shown, the tension fastener 278 may optionally be configured as a stud (not shown) fixedly mounted to the first member 202. For example, the tension fastener 278 may be configured as a stud (not shown) protruding from the panel and configured to extend completely through a fastener through-hole 280 formed in the second member 250 and secured by a nut (not shown) on the backside of the second member 250. In another example, the tension fastener 278 may be provided as a bolt or screw (not shown) extending through a fastener through-hole 280 formed completely through the first member 202 and the second member 250 and secured by a nut (not shown) on the backside of the first member 202.

Referring still to FIGS. 8-9, the shear bosses 252, shear pockets 204, the tension fasteners 278, and the fastener receptacles 218 may be configured such that in a first loaded condition 314 (FIG. 8), greater than 90% of the shear load 300 is borne by the shear bosses 252, and in a second loaded condition 316 (FIG. 9) in which the shear load 300 exceeds a predetermined threshold, less than 90% of the shear load 300 is borne by the shear bosses 252. FIG. 8 illustrates the structural assembly 200 in a first loaded condition 314 in which the shear load 300 is of a relatively low magnitude such that the bearing force 306 on the shear boss 252 alone resists the shear load 300. In contrast, FIG. 9 illustrates the same structural assembly 200 in a second loaded condition 316 in which the shear load 300 is of a relatively high magnitude such that the combination of the bearing force 306 on the shear boss 252 plus the bearing force 306 on the tension fastener 278 resists the shear load 300. The higher magnitude of the shear load 300 in the second loaded condition 316 of FIG. 9 may result in the core 212 allowing slight relative movement of the opposing face sheets 208, which causes the second member 250 to shift in the in-plane direction until a portion of the inner circumference of one side of the oversized fastener through-hole 280 in the second member 250 contacts the shaft of the tension fastener 278, resulting in bearing force 306 on the tension fastener 278.

Figure 11:
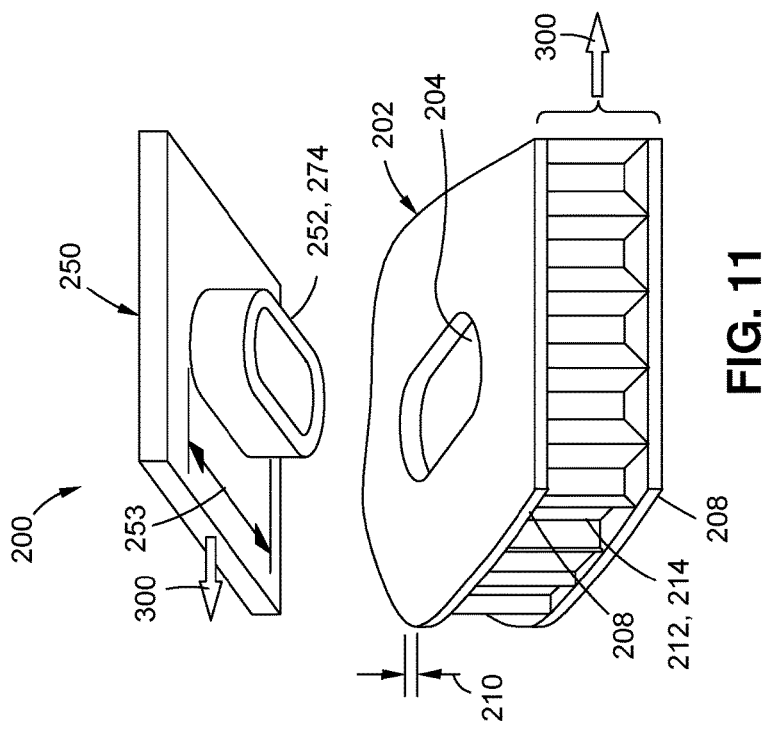
FIG. 11 is an exploded perspective view of an example of a shear boss and shear pocket each having an oblong cross-sectional shape.
Figure 10:
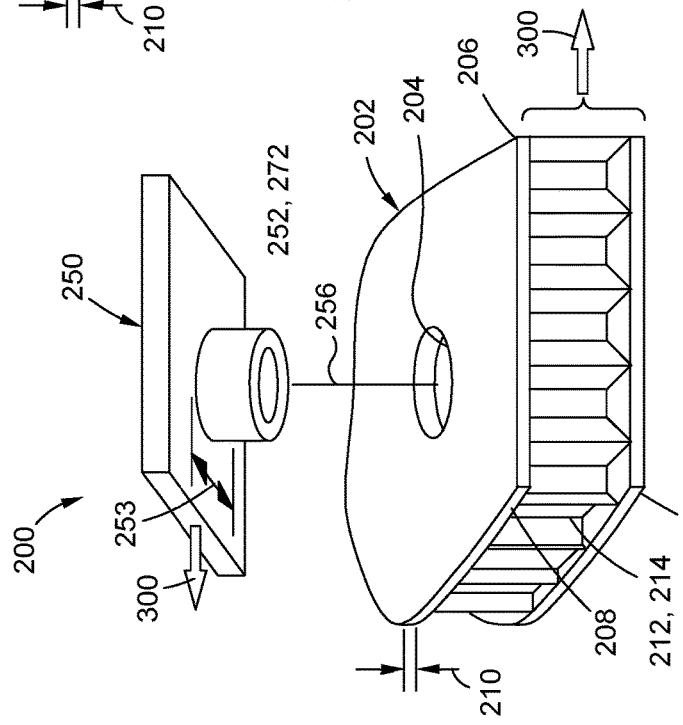
FIG. 10 is an exploded perspective view of an example of a shear boss and shear pocket each having a circular cross-sectional shape and wherein the shear boss is hollow.

FIGS. 10-11 are examples of the shear boss 252 integrally formed with the second member 250. For example, the shear boss 252 may be integrally molded with the second member 250 using polymeric material such as fiber reinforced polymer matrix material or other non-metallic material. Alternatively, the shear boss 252 may be integrally machined with the second member 250. For example, the second member 250 may be machined from metallic material such as aluminum, steel, titanium, or other metallic material. FIG. 10 shows an example of shear boss 252 and a shear pocket 204 each having a circular cross-sectional shape 272. FIG. 11 shows an example of a shear boss 252 and shear pocket 204 each having an oblong cross-sectional shape 274. In some examples, the shear boss 252 may be hollow or may have a hollow portion to reduce the weight of the shear boss 252. A hollow configuration of the shear bosses 252 may reduce the overall weight of the structural assembly 200. For structural assemblies in which the first member 202 is a honeycomb 214 panel, relatively large-sized shear bosses 252 may advantageously increase the bearing area between the shear boss 252 and the face sheets 208 of honeycomb 214 panel and may distribute the shear load 300 over a relatively large area of the honeycomb 214 panel, which may increase the shear load transfer capability between the first member 202 and the second member 250.

In FIG. 10, the shear boss 252 and the shear pocket 204 have a circular cross-sectional shape 272 providing a shear boss width 253 (e.g., diameter) which, in the present disclosure, is measured along a direction perpendicular to the load direction of the shear load 300. As mentioned above, FIG. 11 shows the shear boss 252 and shear pocket 204 in an oblong cross-sectional shape 274. In any of the examples disclosed herein, the shear boss 252 and shear pocket 204 may be oriented such that the shear boss width 253 is perpendicular to the loading direction of the largest shear load 300 to which the first member 202 (e.g., panel) may be subjected. Although not shown, the shear boss 252 and shear pocket 204 may be provided in any one of a variety of non-circular cross-sectional shapes including, but not limited to, oval, square, and rectangular. An oblong, oval and rectangle shape may be oriented in a manner providing greater bearing area in a first load direction 302 of a relatively high magnitude shear load 300, and a smaller bearing area in a second load direction 304 of a relatively low magnitude shear load 300. A square cross-second shape (not shown) may provide equal bearing areas in two load directions of shear load. Square, rectangular, S-shaped and other non-circular cross-sectional shapes may have rounded corners to minimize stress concentrations at such corners.

Figure 12:
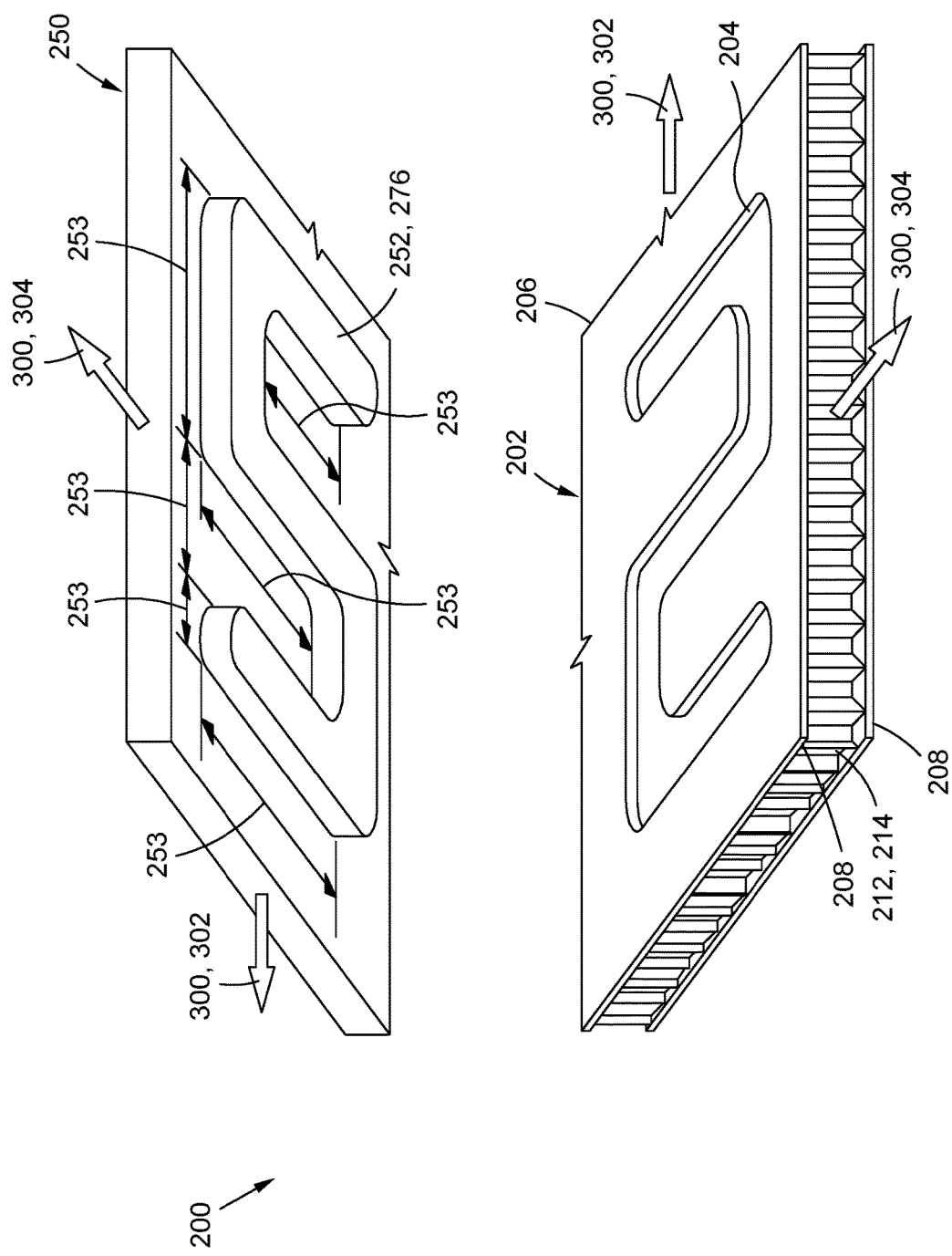
FIG. 12 is an exploded perspective view of an example of a shear boss and shear pocket each having an S-shaped cross-sectional shape.

FIG. 12 illustrates an example of a shear boss 252 and shear pocket 204 each having an S-shaped cross-sectional shape 276. Such S-shaped cross-sectional shape 276 may provide increased bearing area in at least one direction. The total bearing area for a specific load direction of such an S-shaped cross section may comprise the sum of the individual bearing areas as determined by the individual portions of shear boss widths of the S-shaped cross-sectional shape 276. The size of the individual shear bosses 252 of the second member 250 may be based on the face sheet thickness 210 and the maximum shear load 300 to which the panel may be subjected without the occurrence of plastic deformation of the face sheets 208 or the shear bosses 252.

Figure 13:
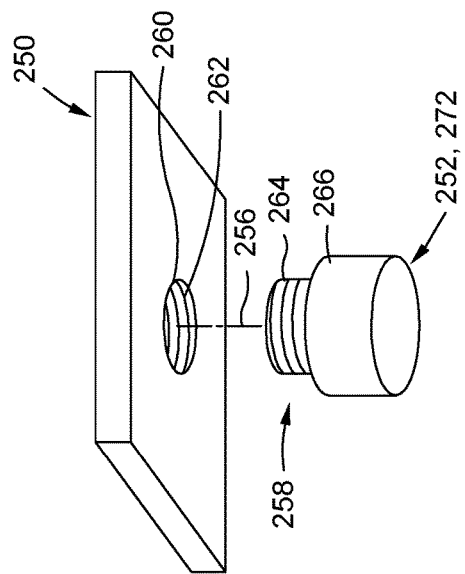
FIG. 13 is an exploded perspective view of an example of a shear boss in a non-integral configuration in which the boss proximal end is adhesively bonded to the second member.
Figure 14:
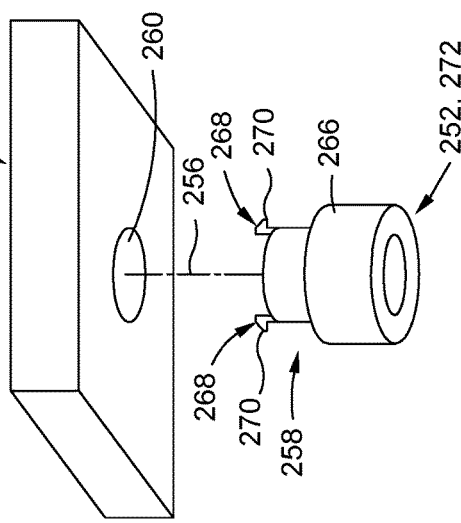
FIG. 14 is an exploded perspective view of an example of a shear boss in which the boss proximal end is configured to be threadably engaged to internal threads formed in a hole in the second member.
Figure 15:
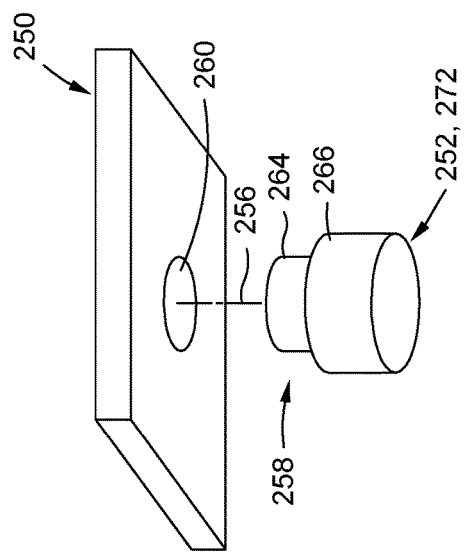
FIG. 15 is an exploded perspective view of an example of shear boss in which the boss proximal end includes boss fingers for non-threadably engaging the shear boss to a hole in the second member.

Referring to FIGS. 13-15, shown are different examples of shear bosses 252 that are non-integral with the second member 250. In some examples, a shear boss 252 may be coupled to the second member 250 by mechanical coupling and forward/or adhesive bonding. For example, FIG. 13 illustrates an example of a shear boss 252 adhesively bonded into a hole 260 in the second member 250 using epoxy (not shown) applied to a boss proximal end 258. FIG. 14 illustrates a shear boss 252 having a boss proximal end 258 that is threadably engaged to internal threads 262 formed in a hole 260 formed in the second member 250. In FIGS. 13-15, the shear boss 252 may be provided with a reduced width portion 264 in the shear boss 252 proximal end in order to form a shoulder 266 that may bear against the surface of the second member 250. FIG. 15 illustrates an example of a shear boss 252 having one or more radially-flexible boss fingers 268 for securing the reduced width portion 264 into the hole 260 in the second member 250. The boss fingers 268 may be formed by providing axial slots (not shown) in the reduced width portion 264. The boss fingers 268 may each terminate at a boss lip 270 configured to abut an opposite side of the second such that the shoulder 266 and the boss lips 270 axially lock the shear boss 252 into the hole 260 and prevent axial movement of the shear boss 252 relative to the second member 250.

Referring to FIGS. 16-19, shown are non-limiting examples of different arrangements for the shear bosses 252 and tension fasteners 278. For example, FIG. 16 illustrates a plurality of shear bosses 252 and tension fasteners 278 arranged in a linear pattern 310 that is oriented in one direction which may correspond to a load direction of the shear load 300. In this regard, FIG. 16 illustrates a single shear boss 252 located between each adjacent pair of tension fasteners 278. The first member 202 includes an arrangement of shear pockets 204 and fastener receptacles 218 (e.g., threaded inserts 220) complementary to the arrangement of shear bosses 252 and tension fasteners 278 of the second member 250.

FIG. 17 and illustrates a further example of a structural assembly 200 in which the shear bosses 252 and tension fasteners 278 are arranged in a linear pattern 310 that is aligned with a load direction of the shear load 300. In the example shown, three (3) shear bosses 252 are located between each adjacent pair of tension fasteners 278 with a complementary arrangement of shear pockets 204 and fastener receptacles 218. However, in another embodiment not shown, two (2) shear bosses 252 may be located between adjacent pair of tension fasteners 278. As may be appreciated, any number of shear bosses 252 may be located between each adjacent pair of tension fasteners 278. The relative quality of shear bosses 252 and tension fasteners 278 may be dictated by the magnitude of the shear load 300 and the magnitude of the tension load 308.

Referring to FIG. 18, shown is an example of a structural assembly 200 having a plurality of shear bosses 252 arranged in a linear pattern 310 that is offset from and parallel to a linear pattern 310 of tension fasteners 278. The offset configuration of FIG. 18 may provide increased shear load 300 capability relative to an arrangement where the shear bosses 252 and tension fasteners 278 are aligned, due to the larger quantity of shear bosses 252 relative to tension fasteners 278 in the offset configuration of FIG. 18.

Referring to FIG. 19, shown is an example of a structural assembly 200 having a plurality of shear bosses 252 and tension fasteners 278 arranged in at least two linear patterns 310 respectively oriented in two different directions. The orientation of the linear patterns 310 may be may be aligned with shear loads 300 oriented in two different load directions. For example, the second member 250 may be configured to resist shear load 300 oriented along a first load direction 302 in addition to resisting shear load 300 oriented along a second load direction 304 that may be orthogonal to the first load direction 302. In any embodiment disclosed herein, the tolerance of the spacing 312 between theoretical centers of a series of shear bosses 252 and tension fasteners 278 (and corresponding shear pockets 204 and fastener receptacles 218) may be no greater than 0.005 inch (0.127 millimeters) to ensure the ability to assemble the first member 202 to the second member 250 in consideration of manufacturing and assembly tolerances. For shear bosses 252 and shear pockets 204 having circular cross-sectional shapes 272, the theoretical center may be the center of the circular cross-sectional shape. For shear bosses 252 and shear pockets 204 having non-circular cross-sectional shapes, the theoretical center may be defined as the location of the area centroid of the cross-sectional shape.

Figure 20:
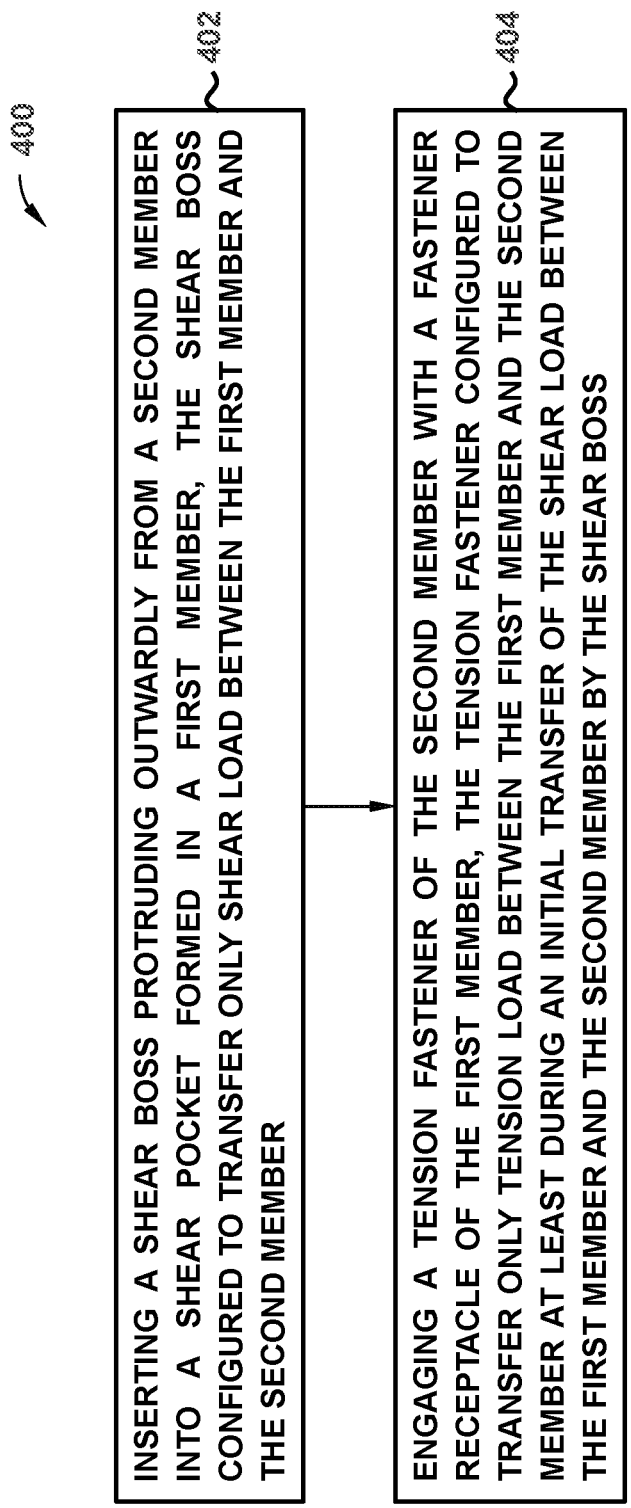
FIG. 20 is a flowchart of operations included in a method of assembling a structural assembly.

Referring to FIG. 20, shown is a flowchart illustrating a method 400 of assembling a first member 202 with a second member 250. Step 402 of the method includes inserting a shear boss 252 protruding outwardly from a second member 250 into a shear pocket 204 formed in a first member 202. As described above, the shear boss 252 has a boss cross-section shaped that is complementary to the pocket cross-section of the first member 202. The shear boss 252 is configured to transfer only shear load 300 between the first member 202 and the second member 250.

Step 402 of inserting the shear boss 252 into the shear pocket 204 includes non-threadably engaging the shear boss 252 to the shear pocket 204. As mentioned above, the shear bosses 252 are non-attached (e.g., non-fastened, non-bonded) to the first member 202. The shear bosses 252 may have a generally constant cross section along an axial direction, thereby preventing engagement of the shear boss 252 with the first member 202. In some examples, the first member 202 may be provided as sandwich panel 206 comprised of a pair of face sheets 208 interconnected by a core 212. In such examples, step 402 may include inserting the shear boss 252 into the shear pocket 204 formed in the face sheet 208 located nearest the second member 250.

Step 404 of the method 400 includes engaging a tension fastener 278 of the second member 250 with a fastener receptacle 218 of the first member 202. As described above, the tension fastener 278 is configured to transfer only tension load 308 between the first member 202 and the second member 250 at least during an initial transfer of the shear load 300 between the first member 202 and the second member 250 by the shear boss. Step 404 of engaging the tension fastener 278 with the fastener receptacle 218 may include extending the tension fastener 278 through a fastener through-hole 280 in the second member 250 and into threaded engagement with a threaded insert 220 of the first member 202, as shown in FIGS. 5-6.

Referring to the examples shown in FIGS. 16-19, step 402 of inserting the shear boss 252 into the shear pocket 204 and step 404 engaging the tension fastener 278 with the fastener receptacle 218 may respectively include inserting a plurality of shear bosses 252 arranged in at least one linear pattern 310 of the second member 250 with a corresponding arrangement of shear pockets 204 of the first member 202, and engaging a plurality of tension fasteners 278 arranged in the linear pattern 310 with a corresponding arrangement of fastener receptacles 218 of the first member 202. As described above, the second member 250 may include one or more shear bosses 252 (e.g., a pair of shear bosses 252) between each adjacent pair of tension fasteners 278 and respectively engaged to shear pockets 204 and fastener receptacles 218 in the first member 202. The plurality of shear bosses 252 may arranged in a linear pattern 310 that is offset from and parallel to a linear pattern 310 of the tension fasteners 278 as shown in FIG. 18. In another example, a plurality of shear bosses 252 and tension fasteners 278 may be arranged in at least two linear patterns 310 respectively oriented in two different directions, as shown in FIG. 19.

Figure 21:
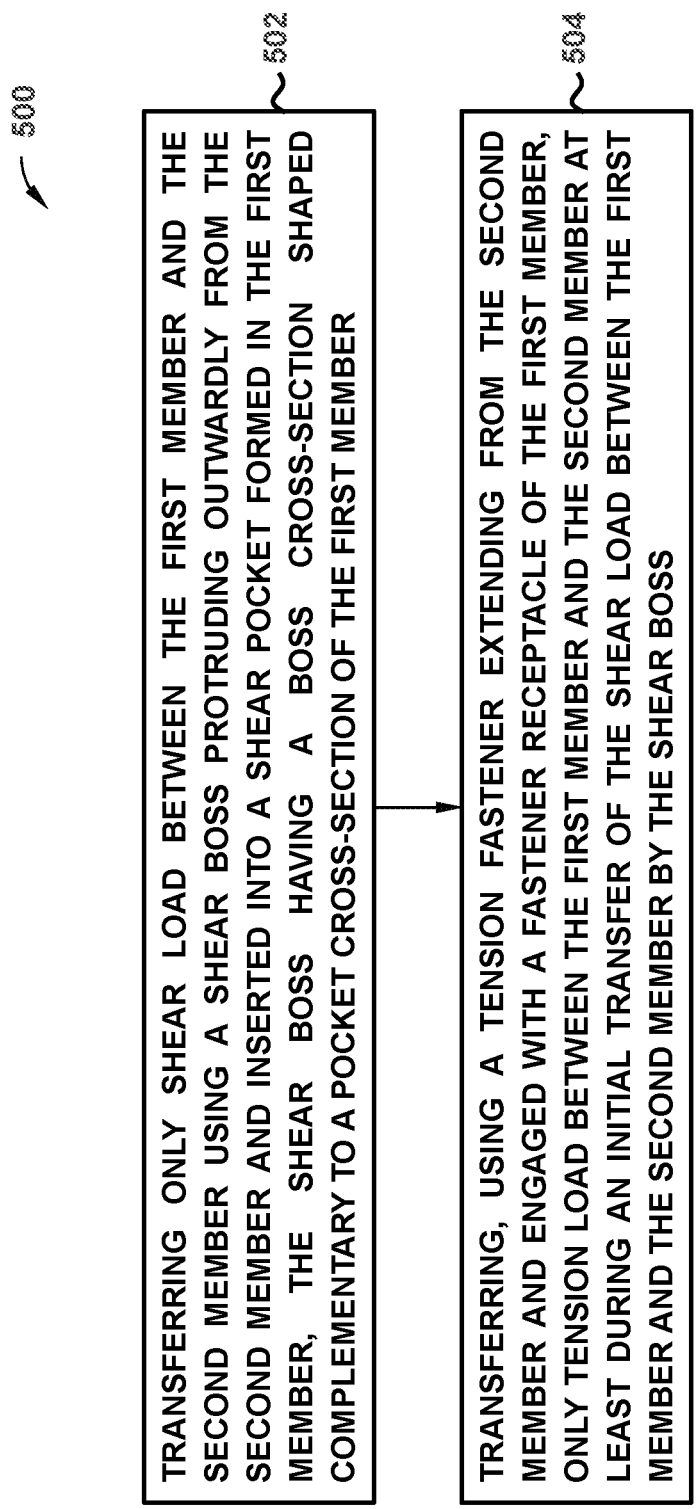
FIG. 21 is a flowchart of operations included in a method of transferring shear load in a structural assembly.

Referring to FIG. 21, shown is a flowchart illustrating a method 500 of transferring shear load 300 between a first member 202 and a second member 250. Step 502 of the method 500 includes transferring only shear load 300 between the first member 202 and the second member 250 using a shear boss 252 protruding outwardly from the second member 250 and inserted into a shear pocket 204 formed in the first member 202. As described above, the shear boss 252 has a boss cross-section that is shaped complementary to the pocket cross-section of the first member 202.

Step 504 of the method 500 includes transferring, using the tension fastener, only tension load 308 between the first member 202 and the second member 250 at least during an initial transfer of the shear load 300 between the first member 202 and the second member 250 by the shear boss. Step 502 of transferring only shear load 300 between the first member 202 and the second member 250 includes transferring the shear load 300 using one or more shear bosses 252 non-threadably engaged to the shear pocket 204 and non-attached to the first member 202. In the presently-disclosed method 500, the shear bosses 252 are non-attached to the first member 202 and are incapable of transferring tension load 308 between the first member 202 and the second member 250.

As shown in FIGS. 6-7, step 504 of transferring tension load 308 between the first member 202 and the second member 250 may include transferring the tension load 308 using one or more tension fasteners 278 extended through a corresponding quantity of fastener through-holes 280 in the second member 250 and threadably engaged with a corresponding quantity of threaded inserts 220 of the first member 202. For examples where the first member 202 is a sandwich panel 206 comprised of a pair of face sheets 208 interconnected by a core 212, step 502 of transferring only shear load 300 between the first member 202 and the second member 250 includes transferring the shear load 300 from the shear boss 252 into the shear pocket 204 formed in the face sheet 208 nearest the second member 250. In the above-described example of an aircraft cabin 104, step 504 of transferring the tension load 308 between the first member 202 and the second member 250 includes transferring the tension load 308 from the bracket 254 to the sandwich panel 206 of a strongback 118 supporting a series of storage bins of the aircraft cabin 104.

Referring to the examples of the structural assembly 200 of FIGS. 8-9, step 502 of transferring the shear load 300 using the shear boss 252 includes transferring the shear load 300 under a first loaded condition 314 (e.g., FIG. 8) in which greater than 90% of the shear load is borne by the shear boss 300, and transferring the shear load under a second loaded condition 316 (e.g., FIG. 9) in which the shear load 300 exceeds a predetermined threshold, in which case less than 90% of the shear load is borne by the shear boss and a remainder of the shear load is borne by the tension fastener. As described above, the structural assembly 200 is arranged such that in the first loaded condition 314, the bearing force 306 on the shear boss 252 alone resists the shear load 300 due to the tension fastener 278 being incapable of transferring shear load 300 in such first loaded condition 314. For example, the fastener through-hole 280 in the second member 250 may be oversized and/or the threaded insert 220 may be a floating insert to prevent the tension fastener 278 from picking up shear load 300. However, in the second loaded condition 316 with correspondingly higher shear load 300, the tension fastener 278 picks up a portion of the shear load 300 resulting in a combination of bearing force 306 on the shear boss 252 plus the bearing force 306 on the tension fastener 278. In some examples, the core 212 may allow slight relative movement of the opposing face sheets 208 of the first member 202 which may allow the second member 250 to shift or move in the in-plane direction until an inner side of the oversized fastener through-hole 280 in the second member 250 contacts the shaft of the tension fastener 278 and/or until the floating insert (e.g., threaded insert 220) is against its radial movement limit.

Referring to the examples of FIGS. 16-19, step 502 of transferring the shear load 300 using the shear boss 252 includes transferring the shear load 300 using a plurality of shear bosses 252 arranged in at least one linear pattern 310 of the second member 250 and inserted into a corresponding arrangement of shear pockets 204 of the first member 202, and step 504 of transferring the tension load 308 using the tension fastener 278 includes transferring the tension load 308 using a plurality of tension fasteners 278 arranged in the linear pattern 310 and engaged with a corresponding arrangement of fastener receptacles 218 of the first member 202. In an example not shown, the step 502 of transferring the shear load 300 using the shear boss 252 may include transferring the shear load 300 using a pair of the shear bosses 252 located between at least one of adjacent pairs of tension fasteners 278 arranged in a linear pattern 310. Referring briefly to the example of FIG. 18, step 502 of transferring the shear load 300 using the shear boss 252 may include transferring the shear load 300 using a plurality of shear bosses 252 arranged in a linear pattern 310 that is offset from and parallel to a linear pattern 310 of the tension fasteners 278. Referring briefly to example of FIG. 19, step 502 of transferring the shear load 300 using the shear boss 252 may include transferring the shear load 300 using a plurality of shear bosses 252 arranged in at least two linear patterns 310 respectively oriented in two different directions and inserted into a corresponding arrangement of shear pockets 204 of the first member 202.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A structural assembly comprising:
   a first member having at least one fastener receptacle and at least one shear pocket, the at least one shear pocket having a pocket cross-section;
   a second member having at least one shear boss protruding outwardly from the second member, the at least one shear boss having a boss cross-section shaped complementary to the pocket cross-section, the at least one shear boss configured to be axially inserted into the at least one shear pocket and being non-fastened to the first member and limited to transferring only shear load between the first member and the second member; and a tension fastener configured to engage the at least one fastener receptacle and couple the first member to the second member and transfer only tension load therebetween at least during an initial transfer of the shear load between the first member and the second member by the at least one shear boss.

2. The structural assembly of claim 1, wherein:
the at least one shear boss is non-threadably engaged to the first member.

3. The structural assembly of claim 1, wherein:
the at least one fastener receptacle is a threaded insert in the first member; and
the tension fastener extends through a fastener through-hole in the second member and is threadably engaged to the threaded insert.

4. The structural assembly of claim 1, wherein:
the first member is a sandwich panel comprised of a pair of face sheets interconnected by a core; and
the at least one shear pocket being formed in one of the face sheets.

5. The structural assembly of claim 4, wherein:
the core is honeycomb; and
the at least one shear boss is hollow.

6. The structural assembly of claim 1, wherein:
the at least one shear boss is integral to the second member.

7. The structural assembly of claim 1, wherein:
the at least one shear boss is coupled to the second member by at least one of mechanical coupling and adhesive bonding.

8. The structural assembly of claim 1, wherein:
the at least one shear boss has a boss proximal end that is threadably engaged to internal threads formed in a hole in the first member.

9. The structural assembly of claim 1, wherein:
the at least one shear boss, the at least one shear pocket, and the tension fastener are configured such that in a first loaded condition, greater than 90% of the shear load is borne by the at least one shear boss and in a second loaded condition in which the shear load exceeds a predetermined threshold, less than 90% of the shear load is borne by the at least one shear boss.

10. The structural assembly of claim 1, wherein:
the second member includes a plurality of shear bosses and tension fasteners arranged in at least one linear pattern of at least one shear boss between each adjacent pair of tension fasteners; and
the first member including an arrangement of shear pockets and fastener receptacles complementary to the linear pattern of shear bosses and tension fasteners of the second member.

11. A method of assembling a first member with a second member, comprising:
axially inserting a shear boss protruding outwardly from a second member into a shear pocket formed in a first member, the shear boss having a boss cross-section shaped complementary to a pocket cross-section of the first member, the shear boss being non-fastened to the first member and limited to transferring only shear load between the first member and the second member; and
engaging a tension fastener of the second member with a fastener receptacle of the first member, the tension fastener configured to transfer only tension load between the first member and the second member at least during an initial transfer of the shear load between the first member and the second member by the shear boss.

12. The method of claim 11, wherein the step of axially inserting the shear boss into the shear pocket comprises:
non-threadably engaging the shear boss to the shear pocket.

13. The method of claim 11, wherein the step of engaging the tension fastener with the fastener receptacle comprises:
extending the tension fastener through a fastener through-hole in the second member and into threaded engagement with a threaded insert of the first member.

14. The method of claim 11, wherein the first member is a sandwich panel comprised of a pair of face sheets interconnected by a core, the step of axially inserting the shear boss into the shear pocket comprises:
axially inserting the shear boss into the shear pocket formed in the face sheet nearest the second member.

15. The method of claim 11, wherein the steps of axially inserting the shear boss into the shear pocket and engaging the tension fastener with the fastener receptacle comprise:
axially inserting a plurality of shear bosses arranged in at least one linear pattern of the second member with a corresponding arrangement of shear pockets of the first member; and
engaging a plurality of tension fasteners arranged in the linear pattern with a corresponding arrangement of fastener receptacles of the first member.

16. A method of transferring shear load between a first member with a second member, comprising:
transferring only shear load between the first member and the second member using a shear boss protruding outwardly from the second member and axially inserted into a shear pocket formed in the first member and being non-attached to the first member, the shear boss having a boss cross-section shaped complementary to a pocket cross-section of the first member; and
transferring, using a tension fastener extending from the second member and engaged with a fastener receptacle of the first member, only tension load between the first member and the second member at least during an initial transfer of the shear load between the first member and the second member by the shear boss.

17. The method of claim 16, wherein the first member is a sandwich panel comprised of a pair of face sheets interconnected by a core, the step of transferring only shear load between the first member and the second member comprises:
transferring the shear load from the shear boss into the shear pocket formed in the face sheet nearest the second member.

18. The method of claim 16, wherein the steps of transferring the shear load using the shear boss and transferring the tension load using the tension fastener comprise:
transferring the shear load using a plurality of shear bosses arranged in at least one linear pattern of the second member and axially inserted into a corresponding arrangement of shear pockets of the first member; and
transferring the tension load using a plurality of tension fasteners arranged in the linear pattern and engaged with a corresponding arrangement of fastener receptacles of the first member.

19. The method of claim 16, wherein the step of transferring the shear load using the shear boss comprises:
transferring shear load oriented in two different directions using a plurality of shear bosses arranged in at least two linear patterns respectively oriented in the two different directions and axially inserted into a corresponding arrangement of shear pockets of the first member.

20. The method of claim 16, wherein the step of transferring the shear load using the shear boss comprises:
- transferring the shear load under a first loaded condition in which greater than 90% of the shear load is borne by the shear boss; and
- transferring the shear load under a second loaded condition in which the shear load exceeds a predetermined threshold, in which case less than 90% of the shear load is borne by the shear boss and a remainder of the shear load is borne by the tension fastener.

* * * * *